Patented Oct. 9, 1934

1,976,283

UNITED STATES PATENT OFFICE 1,976,283

METHOD OF TREATING SOLUTIONS OF PHOSPHATE ROCK IN NITRIC ACID

Erling Johnson, Odda, Norway, assignor to firm Odda Smelteverk A/S, Odda, Norway No Drawing. Application October 25, 1930, Serial No. 491,318. In Norway October 28, 1929

3 Claims. (Cl. 23—102)

In my Patent No. 1,816,285 a process of treating phosphate rock with nitric acid is described, according to which the phosphate rock by means of nitric acid of medium grade f. inst. 45–65 per cent is transformed into a solution of free phosphoric acid and calcium nitrate. From this solution a part of the calcium nitrate is caused to crystallize and the crystals are subsequently separated from the mother liquor.

If the phosphate rock contains any considerable quantities of impurities which are insoluble in the nitric acid used it is necessary to separate these impurities from the solution. This separation meets however with considerable difficulties. The liquor does not lend itself to filtration, and settling and decantation in that, for instance, continuously working Dorr apparatus as is used in other processes, does not prove efficient when applied to the solution in question.

Example

Phosphate rock of 35 per cent $P_2O_5$ was dissolved in nitric acid of 55 per cent, of which an excess of 10 per cent was used. The resulting solution was poured into a wide cylinder and left to stand for deposition. The temperature was maintained at some 40° C. After 72 hours the insoluble impurities had still not settled so much that even the uppermost layer of the liquid had become limpid. This slow deposition is due to the fact that the insoluble impurities of the phosphate rock are extremely finely divided and at the same time the solution is rather viscous, so that the rate of deposition is exceedingly low. Also even the least disturbance of the liquid is sufficient to make the deposit whirl up. It is further very inconvenient that it is not possible to operate at room temperature, some 15–25° C. but that a temperature of, say 50° C. is necessary in order to decrease the viscosity so much that any deposition at all is taking place at any sort of reasonable rate. At such an elevated temperature the material of apparatus and filters is however strongly corroded by the very acid solution. When fluor compounds are present the conditions of corrosion are further aggravated.

If the impurities occur only in rather small quantities it is possible to effect crystallization without prior removal of impurities. The latter will then remain with the calcium nitrate crystals when these are subsequently separated from the solution on a filter or in a centrifugal machine.

The present invention relates to new methods of working which permit a convenient treatment of the crystallized calcium nitrate in presence of these insoluble impurities, and at the same time allow to remove a considerable part of the insoluble impurities after the crystallization has taken place. The method involves considerable advantages, as will be seen from what is explained below.

In carrying out the new method the solution of phosphate rock in nitric acid is cooled without any foregoing removal of impurities. The refrigeration and crystallization are conveniently effected in counter-current with suitable circulating cooling liquids. Most efficiently the crystallization is effected under stirring in a continuously working apparatus which allows formation of large crystals. The formation of well-developed crystals is not impeded by the presence of the impurities. These calcium nitrate crystals are freed from the phosphoric acid mother liquor on a filter or in a centrifugal machine. It is of essential importance that just the formation of well-developed crystals permits the use of coarse filter cloth or of an appropriate fine-meshed wire netting of acid resisting metal, which allows rapid passage of the mother liquor together with a very considerable part of the insoluble impurities without any clogging of the filter, while the crystals are retained. In fact almost from the beginning a practically constant flowing through the filter is attained.

After the liquid in this way has been freed from the main part of calcium nitrate initially present, the resulting filtrate is much less viscous. This has the effect that the insoluble impurities which are still contained in the filtrate are settling much more readily and may be filtered off far more easily. The following example shows this:

Example 250 ccm. of a solution of phosphate rock in nitric acid of 50 per cent with 10% excess of acid are passing the filter at a rate corresponding to 1½ hours by using a Büchner filter funnel of 10 cm. diameter, with a paper filter and maintaining the temperature of the liquid at 40° C. At last the filtration nearly stopped.

After separation of the calcium nitrate in the way described above, a solution was obtained which under quite the same conditions passed through the filter in 4½ minutes.

Further the velocity of settling is to be mentioned.

The two solutions were poured into two like cylinders and the content of both cylinders was maintained at the same temperature of some 30° C. The solution which had not been freed from calcium nitrate showed a velocity of settling corresponding to the formation of a layer of limped liquor of ½ cm. height in 24 hours. The solution which had been freed from calcium nitrate showed some 10 cm. in that time.

As it is seen from this test the mother liquor is easy to filter when the calcium nitrate is removed.

Preferably the mother liquor is warmed to 30–40° C., whereby its initial low temperature may be utilized for cooling purposes. Instead of a filter a settling centrifuge may be used. As the sediment is easily settled continuous decantation and washing in counter-current f. inst. in a Dorr apparatus may also prove serviceable.

The finally resulting dilute wash liquor is conveniently used for irrigation of a nitric acid plant for production of the necessary acid for dissolving phosphate rock. In this way evaporation expenses are saved.

The described method does not only permit a much greater velocity of filtration, but it is of advantage also in so far as it allows to remove the insoluble impurities from the strongly acid solution at a much lower temperature whereby the corrosion of apparatus is considerably diminished. Still greater advantages in this latter respect may be attained by neutralizing the solution wholly or partly with ammonia and the like after removal of the calcium nitrate crystals but before the filtration is effected. Without any risk of corrosion the velocity of filtration may in this case be increased by working at higher temperatures f. inst. 50–100° C.

The calcium nitrate which is separated from the solution contains the rest of insoluble impurities. It may be freed from these impurities when it is melted in its water of crystallization, eventually under supply of further water. In this way the calcium nitrate may be easily freed from impurities by filtration at 75° C.

Hereby the very important advantage is realized that the calcium nitrate eventually after it has been freed from phosphoric acid and nitric acid by neutralization may be treated even at higher temperatures without any greater risk of corrosion of the apparatus.

If the phosphoric acid containing mother liquor or the calcium nitrate is used for further reactions, as f. inst. if the mother liquor is treated with ammonium sulphate to remove the rest of the calcium in the solution or if the calcium nitrate is by means of potassium sulphate converted into potassium nitrate, the filtration of the mother liquor or of the calcium nitrate may be omitted, and the insoluble impurities may be removed only together with the calcium precipitate formed, i. e., in the above examples calcium sulphate. In order to obtain an easily filtrable mixed product of precipitate and impurities, the precipitation is conveniently carried out at some 100° C. and the mixed product is subsequently removed by filtration or by decantation and washing in counter-current f. inst. in continuously working Dorr apparatus. The resulting dilute wash liquors may be united and utilized in the manufacture of nitric acid as already mentioned.

The apportionment of the insoluble impurities among the calcium nitrate which is separated and the remaining mother liquor may vary within wide limits.

The coarser impurities will of course stay with the calcium nitrate while the finely divided impurities will remain in the mother liquor.

The following example illustrates the conditions in using an Algerian phosphate of high quality with a relatively low content of impurities insoluble in nitric acid.

The phosphate contained 35 per cent $P_2O_5$ and 8 per cent $CaCO_3$. By treatment with nitric acid as described a solution was obtained with a content of 3,1 per cent undissolved residue (after washing and drying). The separation of the calcium nitrate crystals obtained by cooling of the solution was effected in a centrifugal machine using a relatively wide-meshed cotton fabric as filter. The crystals retained 2,1 per cent of the insoluble residue, while 1,6 per cent accompanied the mother liquor. The centrifuging proceeded quite readily with this coarse cloth whereas the filtering was quite inoperable when a filter material of such density was used as to give a clear filtrate.

When such relatively small quantities of impurities are present as in this case, the obtained products, crystals and mother liquor, may be worked up separately without further filtration. The calcium nitrate may still easily be worked into the usual marketable product of 15,5 per cent nitrogen. Certainly it is not quite white but it has a rather pleasant light-brown colour. As to the mother liquor it may even be of advantage that it contains small quantities of insoluble, for example, colloidal substances, because if such a mother liquor is neutralized directly for preparing fertilizers with two or more components, the said insoluble impurities will cause formation of hard durable grains which make the fertilizer far more storeable and strewable than the hitherto known products and without any considerable decrease of percentage of fertilizer components. Particularly if a little dicalcium phosphate is present remarkably durable granules are easily obtained.

If greater quantities of insoluble impurities are present it is advisable to effect a more thorough removal of the impurities along the lines indicated above, by subsequent treatment of the separated products, calcium nitrate and mother liquor separately. Just to what extent the removal of insoluble impurities is required for the products will depend upon the quality of phosphates used, upon the desired concentration of the finished products etc.

As already mentioned the apportionment of the insoluble impurities among the calcium nitrate and the phosphoric acid products may be varied. It is easily realized that by far the greater part of the impurities remains with the mother liquor. This may particularly be of advantage if rather impure phosphates are worked. In order to increase the portion of impurities which remain in the mother liquor the calcium nitrate crystals may be subjected to a washing operation with cold mother liquor from a prior operation. The wash liquid will carry away the light and muddy impurities while the coarse impurities as sand and the like will stay with the nitrate crystals. The latter may subsequently be subjected to separation as mentioned above.

This washing or decantation may conveniently be carried out in continuously working apparatus, eventually in immediate continuance of the cooling of the solution and crystallization of calcium nitrate. The solution of the phosphate rock is under motion and indirect cooling, conveyed in counter-current with cooling liquids through a crystallizer with stirring devices or other suitable apparatus. From the crystallizer the mass of mother liquor and crystals pass into settling tanks provided with agitators or such like devices for motion of the mass. In these tanks the nitrate crystals deposit. For this purpose continuously working Dorr tanks of suitable construction may be used. Cold mother liquor from prior operations is supplied to this tank, the supply of liquor being so regulated that desired quantities of insoluble impurities are removed from the nitrate crystals which latter proceed to preferably continuously working filters or centrifugal machines such as for instance rotating suction filters or self-discharging centrifugal machines and the like. These apparatus are conveniently provided with suitable devices for introduction and separate discharge of wash liquids.

By the described method even a relatively low-grade phosphate with a high content of insoluble, hardly filtrable impurities may render on the one hand a calcium nitrate, which immediately may yield a commercial product of the usual nitrogen content of 15,5 per cent and on the other hand a phosphoric acid containing mother liquor, which may easily be freed from the essential part of its impurities as described.

I claim:

1. Method of removing impurities in the process of converting phosphate rock into calcium nitrate and a solution containing free phosphoric acid comprising crystallizing calcium nitrate by cooling the reaction product of phosphate rock and nitric acid of some 45–65 per cent, separating the calcium nitrate crystals together with coarse insoluble impurities from the mother liquor and the fine impurities suspended therein, adding neutralizing substances to the mother liquor and subjecting it to filtration at below 50° C. to remove impurities suspended therein.

2. Method of removing impurities in the process of converting phosphate rock into calcium nitrate and a solution containing free phosphoric acid, comprising crystallizing calcium nitrate by cooling the reaction product of phosphate rock and nitric acid of some 45–65 percent, separating the calcium nitrate crystals together with coarse undissolved impurities from the mother liquor and the fine impurities suspended therein, adding neutralizing substances to the mother liquor and subjecting it to filtration to remove the impurities suspended therein.

3. Method of removing impurities in the process of converting phosphate rock by treatment with nitric acid into calcium nitrate and a solution containing free phosphoric acid, comprising crystallizing calcium nitrate by cooling the reaction product of phosphate rock and nitric acid of some 45–65 per cent, separating the calcium nitrate crystals together with coarse insoluble impurities from the mother liquor and the fine impurities suspended therein, adding neutralizing and precipitating substances to the mother liquor and subjecting it to filtration to remove the impurities and the precipitate.

ERLING JOHNSON.